(12) United States Patent
Liu

(10) Patent No.: US 7,379,193 B2
(45) Date of Patent: May 27, 2008

(54) SENSING DEVICE FOR MEASURING THE THREE-DIMENSION SHAPE AND ITS MEASURING METHOD

(76) Inventor: Lang Liu, #18 Yucai Xiang, Shenyang, Liaoning 110042 (CN)

( * ) Notice: Subject to any disclaimer, the term of this patent is extended or adjusted under 35 U.S.C. 154(b) by 226 days.

(21) Appl. No.: 10/503,839

(22) PCT Filed: Feb. 9, 2002

(86) PCT No.: PCT/CN02/00499

§ 371 (c)(1),
(2), (4) Date: Apr. 18, 2005

(87) PCT Pub. No.: WO03/067185

PCT Pub. Date: Aug. 14, 2003

(65) Prior Publication Data

US 2005/0174581 A1    Aug. 11, 2005

(30) Foreign Application Priority Data

Feb. 9, 2002   (CN) .............................. 02 1 04217

(51) Int. Cl.
*G01B 11/24* (2006.01)
(52) U.S. Cl. ...................................... 356/603; 356/607
(58) Field of Classification Search ......... 356/601–623
See application file for complete search history.

(56) References Cited

U.S. PATENT DOCUMENTS 4,758,093 A * 7/1988 Stern et al. ................. 356/608
5,118,192 A * 6/1992 Chen et al. ................. 356/602
5,396,331 A * 3/1995 Kitoh et al. ................ 356/611
5,570,187 A * 10/1996 Nihei et al. ................ 356/608
6,084,712 A * 7/2000 Harding ..................... 359/618
2006/0232788 A1* 10/2006 Liu ............................ 356/605

* cited by examiner

*Primary Examiner*—Hoa Q. Pham
(74) *Attorney, Agent, or Firm*—Thomas I. Rozsa

(57) ABSTRACT

The present invention discloses a sensing device for measuring the three dimension shape and its measuring method. The said sensing device includes a projecting device, an observing device, a projecting localizer, an observing localizer and a computer for data processing. The optic axis of the projecting device and the optic axis of the observing device are crossed on the surface of the object by the relative motion and the focusing of the projecting device and the observing device, such that the viewing field of the whole field measurement and the position of the zero-order fringe are determined. The projecting device and the observing device are focused automatically by means of the object distance and the image distance of the projecting device in this viewing field, and the object distance and the image distance of the observing device in this viewing field. The camera in the observing device records the fringe patterns respectively after phase shifting and the computer calculates the three dimension surface shape of the object. The present invention achieves whole-field high accuracy and high speed absolute measurement of the three dimension object shape in the variable viewing field.

28 Claims, 7 Drawing Sheets

SENSING DEVICE FOR MEASURING THE THREE-DIMENSION SHAPE AND ITS MEASURING METHOD

TECHNOLOGICAL FIELD

Figure 1:
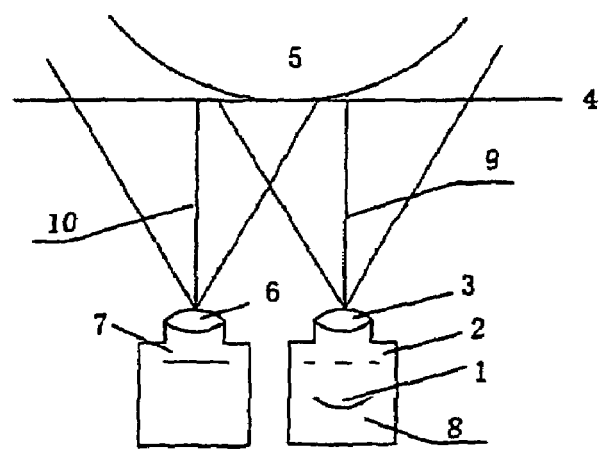
Figure 2:
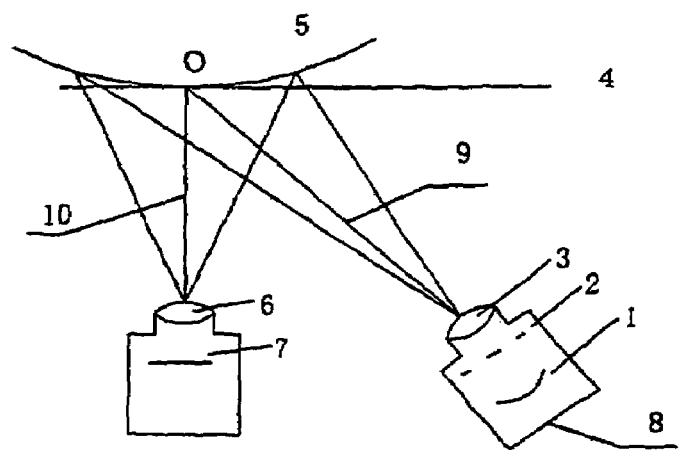
Figure 3:
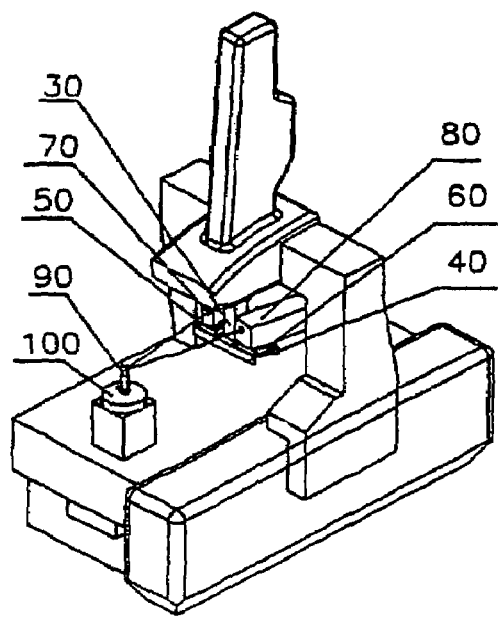
Figure 4:
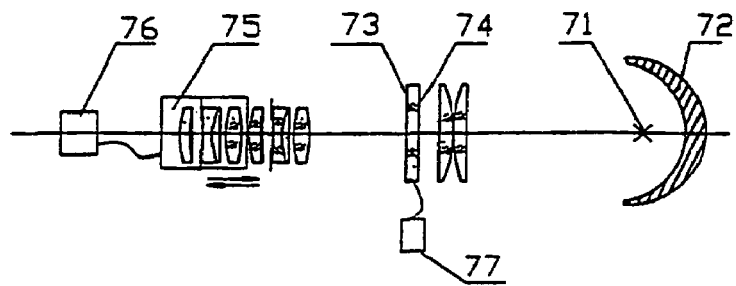
Figure 5:
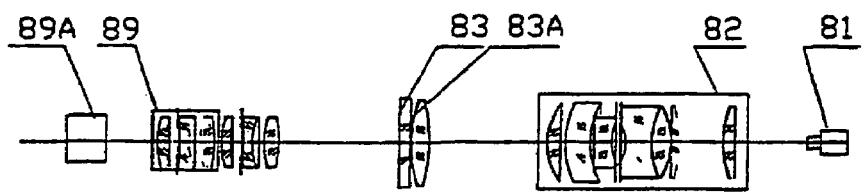
Figure 6:
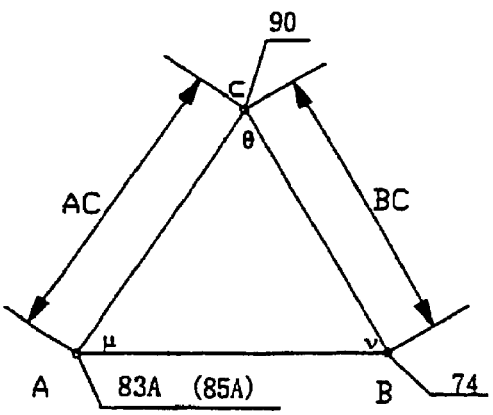
Figure 7:
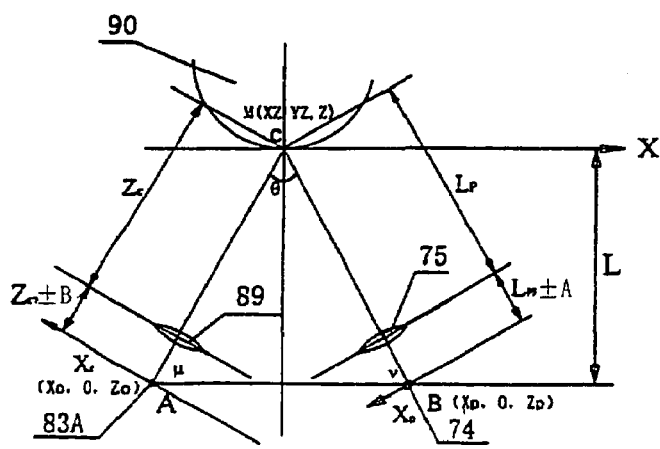
Figure 8:
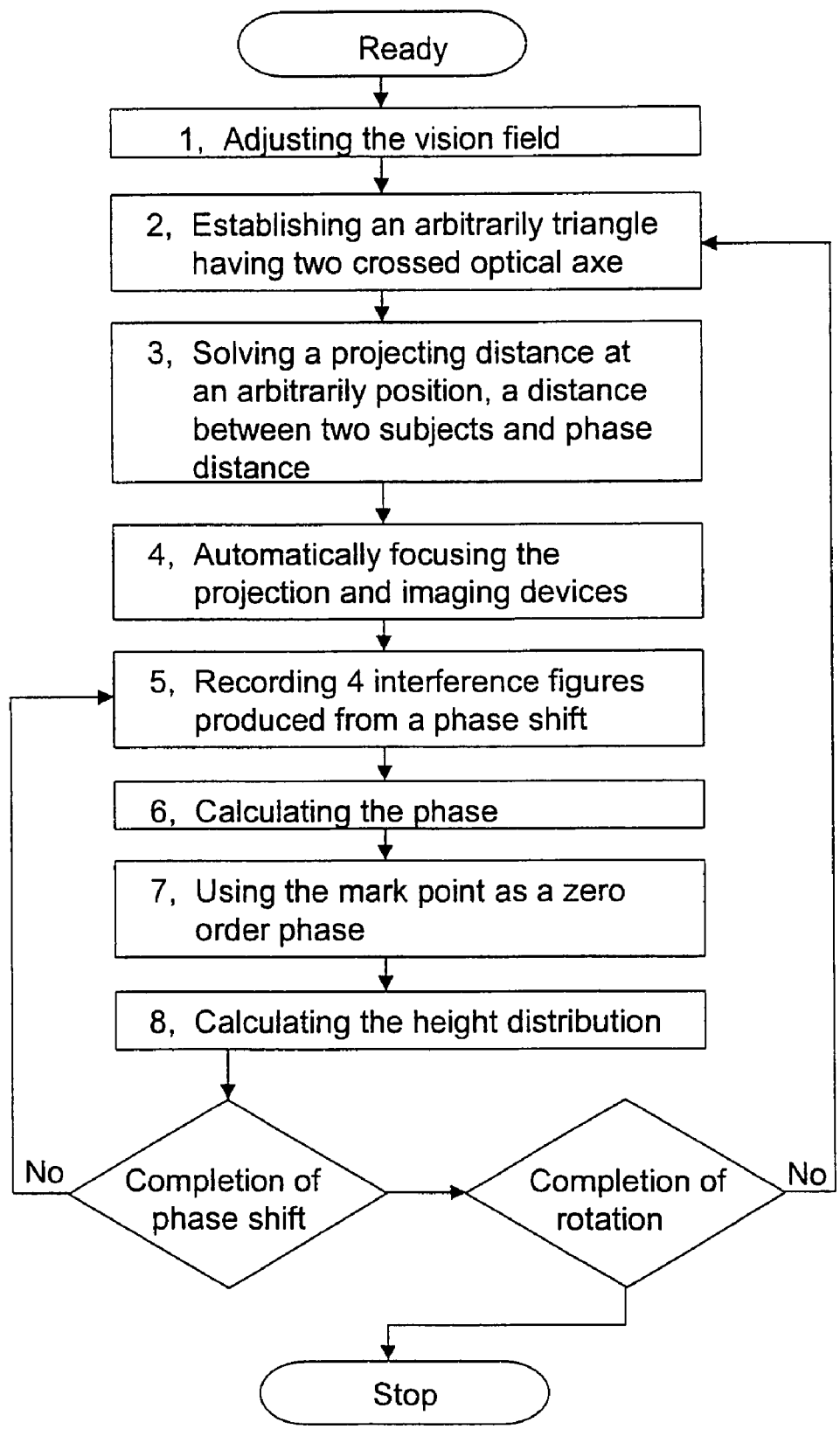
Figure 9:
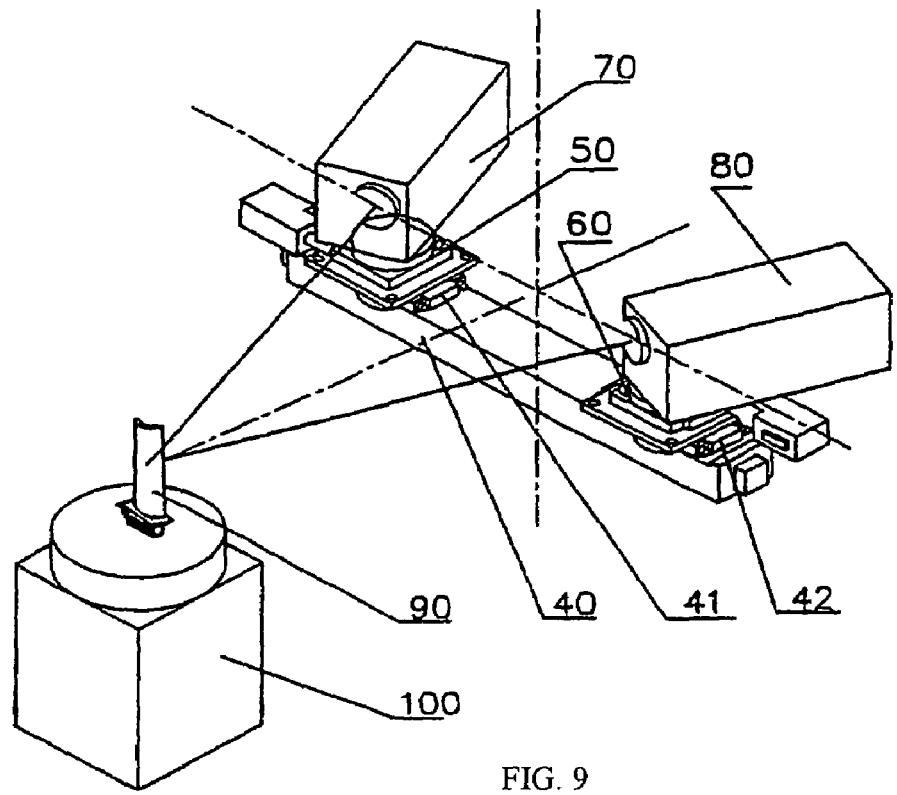
Figure 10:
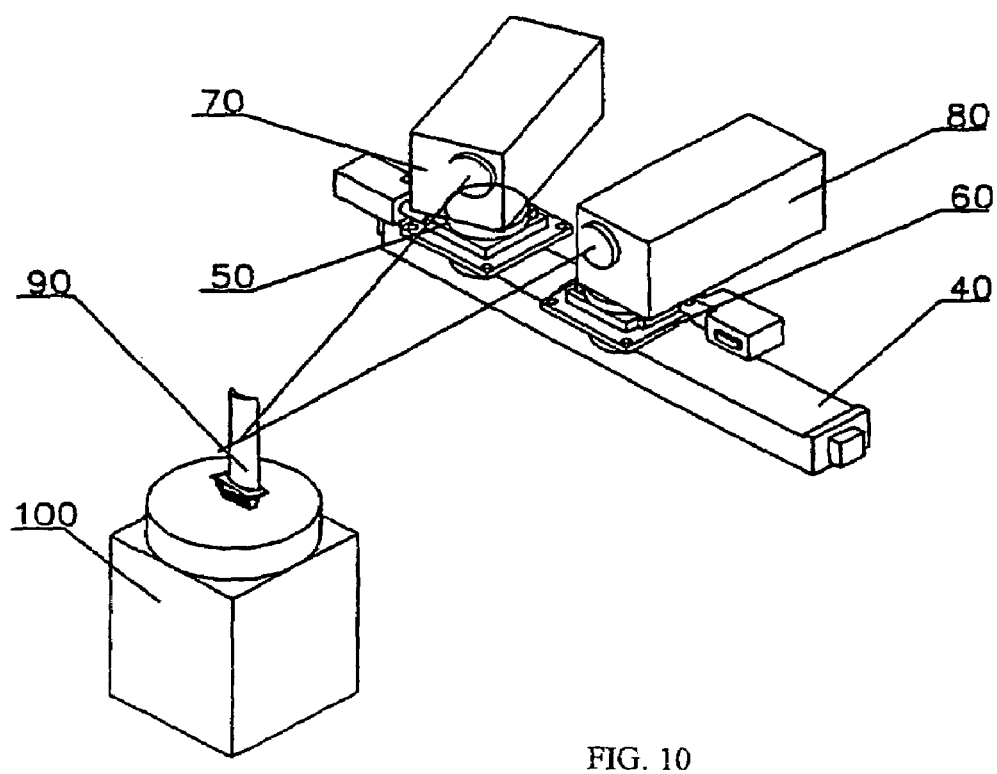
Figure 11:
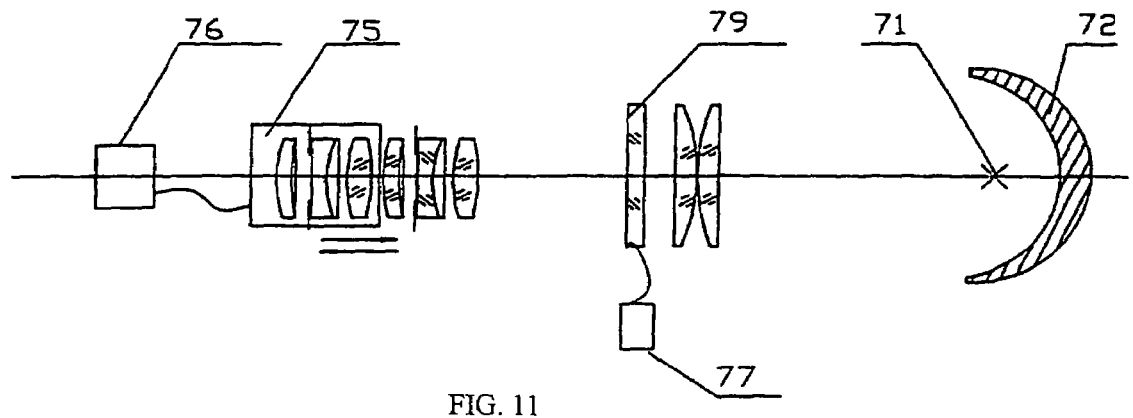
Figure 12:
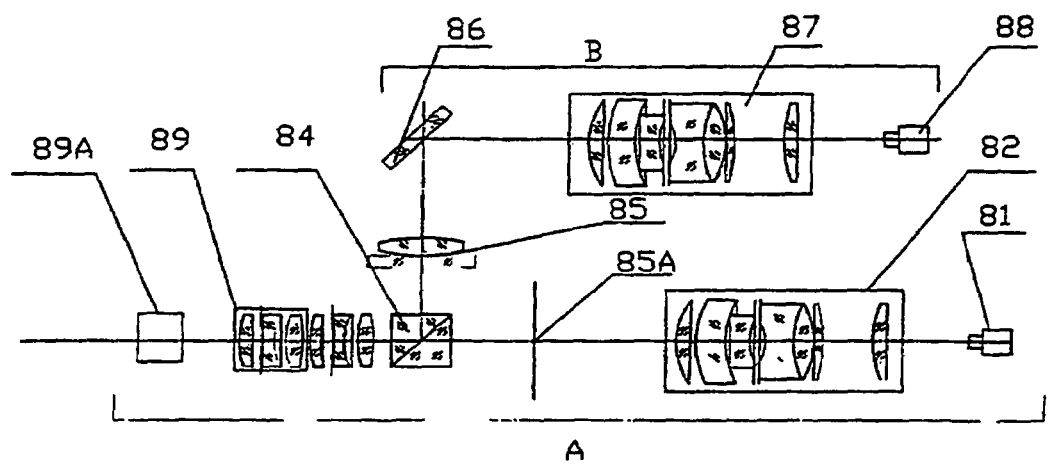
Figure 13:
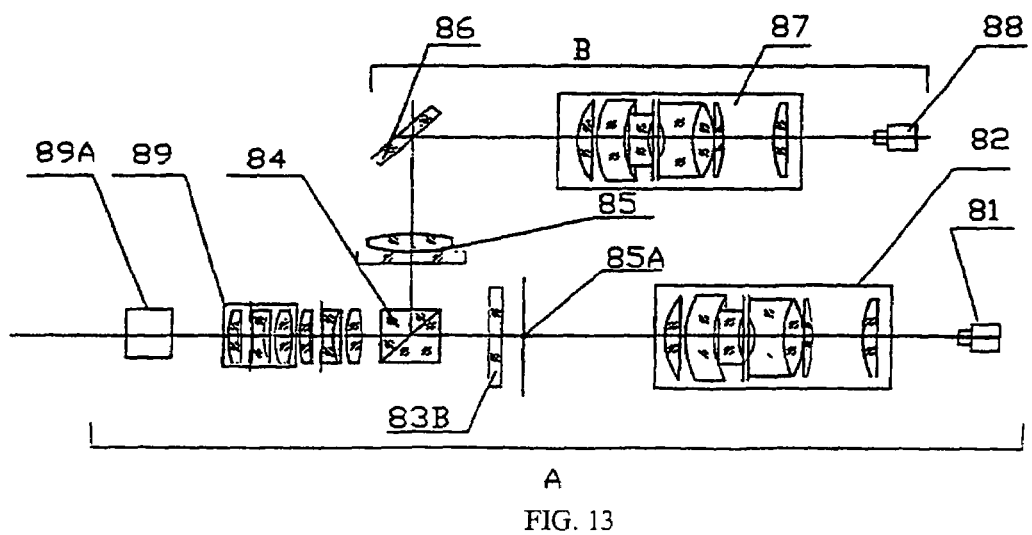
Figure 14:
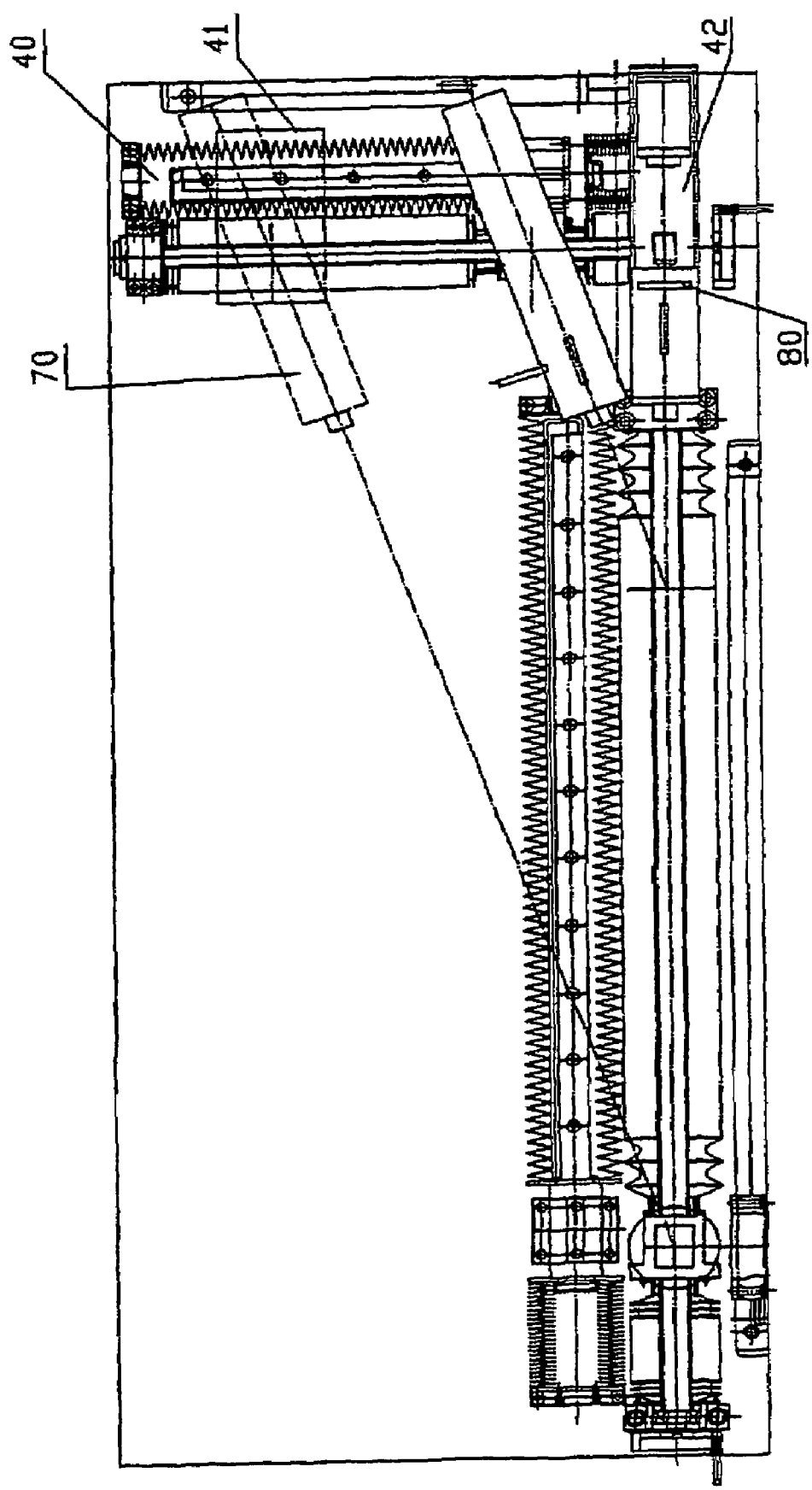
Figure 15:
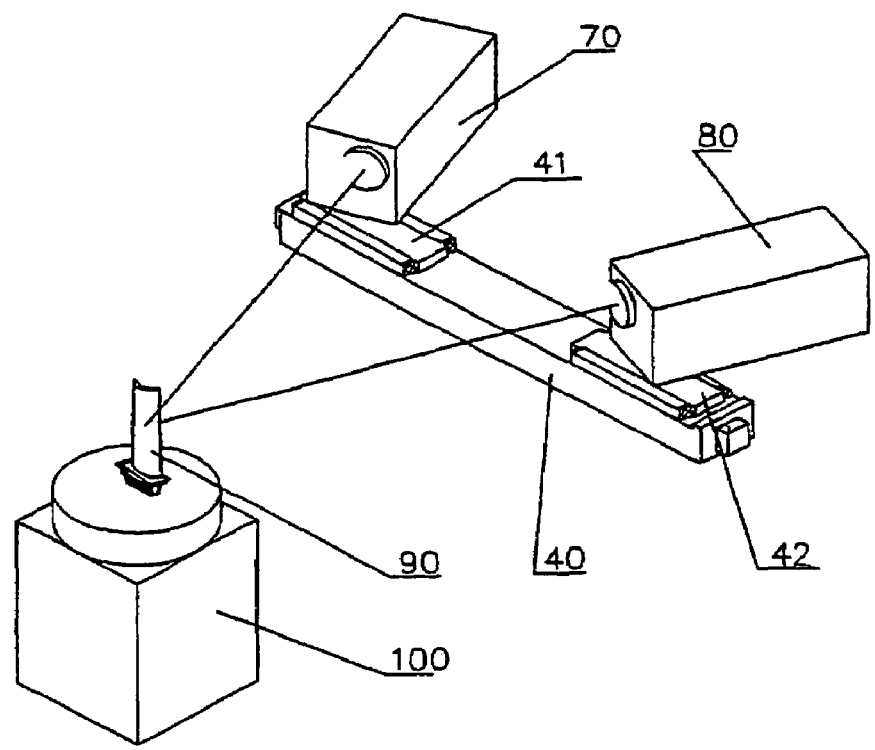
Figure 16:
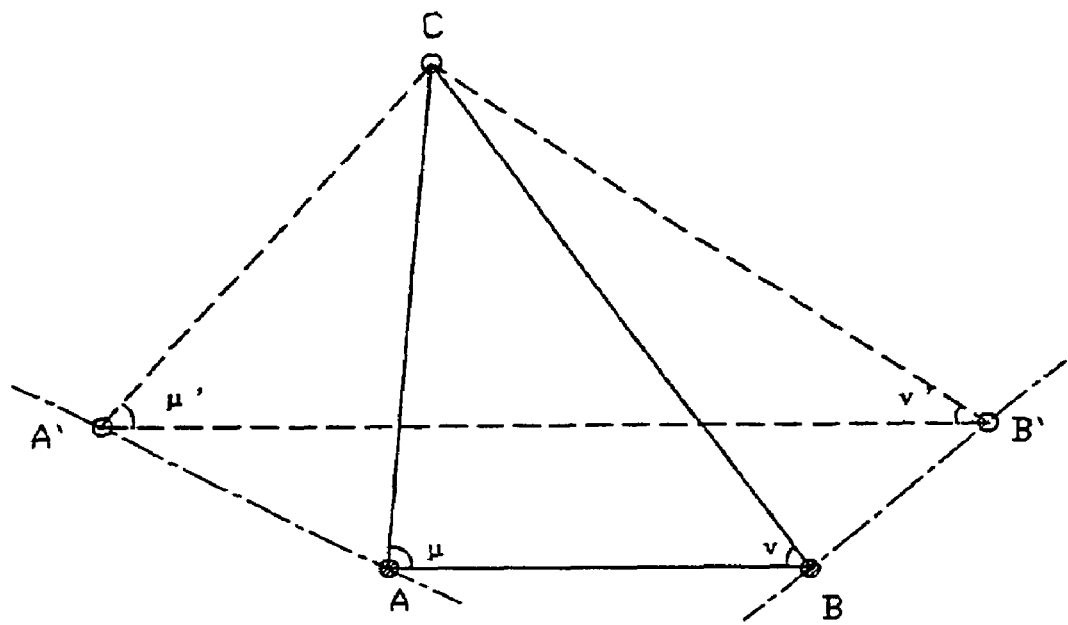

This invention is about a kind of sensing device for 3-D shape measurement and its measuring method, in particular, a sensing device for absolute measurement of object 3-D shape with structured light and its measuring method.

BACKGROUND TECHNOLOGY

The structured light 3-D shape measurement is a kind of technique available for whole-field measurement of object shape. It can adopt parallel optical axes structure or cross-optical axes structure. The structured light in question includes projected grating and projected moire. These two are often used as the same owing to indefinite difference other than the quantity of gratings between them.

Takade and other persons publish the "Fourier Transform Profilometry For The Automatic Measurement Of 3-D Object Shapes" on *Applied Optics* (vol.22, No.24, Dec. 15, 1983,P3977-3982), and Opton Company shows these two structures in the *Moiré Report* issued on its website. Drawing 1 is sketch of parallel optical axes structure, in which the ray from light source 1 is on grating 2, projective imaging lens 3 projects the grating line image onto object surface 5, 4 is virtual reference plane. CCD camera images object surface 5 with deformed grating fringes onto CCD target 7 by observer imaging lens 6. The key point of this structure is that projection device 8's optical axis 9 is coplanar with and parallel to CCD camera's optical axis 10, so the projected grating lines received by CCD camera are coplanar contours, which can facilitate to provide intuitional information about height, but the grating must be placed far away from the optical axis of projector so as to image the grating within the field range of observe camera. Parallel optical axes structure has following problems: (1) It is difficult to keep optical axes parallel; (2) the central parts of optical components of projector and camera are out of work, for the large aberration on their edges will bring about large measuring error.

Cross-optical axes structure is showed in Drawing 2. Its components are same to parallel optical axes structure. The ray from light source 1 is on grating 2, projective imaging lens 3 projects the grating line image on object surface 5, CCD camera images the object surface 5 with grating fringes on it onto CCD target 7 by observer imaging lens 6. The difference lies in that projection device's optical axis 9 crosses CCD camera's optical axis 10 at the point 0 on virtual reference plane 4 to form conjugate image of grating line. Because the image of grating on virtual reference plane 4 are not uniformly spaced fringes, unless pupil is at infinite distance, i.e., telemetric optical system. The projected grating lines received by CCD camera is non-coplanar contours. Cross-optical axes structure is easy to be produced and it utilizes effectively projection device and CCD camera's field of view to decrease measuring error.

American U.S. Pat. No. 5,175,601 declares a high-speed 3-D surface measurement, surface inspection and reverse CAD system. It uses cross-optical axes projected grating to measure 3-D object shape in a fixed field of view.

3-D shape phase measurement technique often adopts FFT and phase-shift methods to deal with data. In the case of FFT, the initial phase modulation on reference plane can be removed automatically, so FFT is applicable for both parallel optical axes structure and cross-optical axes structure. However, because the high-frequency components are filtered with FFT, the resolution of small shape changes at hole or edge is lower.

The phase-shift method of technique above, compared with FFT, has a higher depth resolution and horizontal resolution, and also can measure small shape changes such as hole and edge of surface. But phase-shift method is only applicable for parallel optical axes structure.

There are two puzzles in the application of phase-shift method on cross-optical axes 3-D shape measurement technique. (1) Like that in *Scanning moiré method and automatic measurement of 3-D shapes* by Masanori Idesawa on *Applied Optics* (vol. 16, No.8 August1977, pp2152-2162), the contours described by grating fringes on object surface form a function of fringe order, and the difference in height of contours is not equidistant, instead, it is also a function of fringe order. Therefore, in order to get absolute measurement of 3-D object shape, the absolute fringe order of grating lines must be measured accurately, that is to say, to determine the position of zero-order fringe. But at present we have not the equipment or method to determine the position of zero-order fringe. (2) As a whole-field-of-view measuring device, its optical system shall have a variable field of view. Under a certain field of view, the distances from projection optical system and viewing optical system to object (object distance) and to projected grating and observation plane (image distance) need be measured accurately. But all these can't be settled by technology of today. As a result, the existing cross optical axes measuring device takes a field of view with a certain operating distance as fixed field of view, and gives parameters under the said field of view and marks corresponding relationship between phase and height. Because the calibrated error will influence measurement accuracy, the high-precision whole-field measurement of 3-D object shape is impossible.

CONTENT OF THE INVENTION

The purpose of this invention is to make up the disadvantages of existing structured light object shape measuring method and device with cross optical axes and to provide a new sensing device for 3-D shape measurement. The projection device and observation device of the sensing device in question can be pancratic through their relative motion to realize the crossing of optical axes, change projected object distance and image distance, observed object distance and image distance, determine the position of zero-order fringe, and achieve the high-precision whole-field measurement of variable field of view under the precondition of structured light real-time measurement.

Another purpose of this invention is to provide a method for 3-D object shape measurement by above-mentioned 3-D shape measurement sensing device. This method adopts cross optical axes, changes such operating distances as projected object distance and image distance, observed object distance and image distance to determine the objects of various sizes. Due to its accurate determination of the position of zero-order fringe, it can improve measurement accuracy greatly and achieve a high-precision whole-field measurement of object under the precondition of structured light real-time measurement. In order to reach purposes above, this invention adopts the following technical solution: a sensing device for 3-D shape measurement, including projecting grating or projection device mark point and receiving grating or observation device mark point. The projection device and observation device are placed respectively on projecting positioner and observing positioner that can move relatively to make projection device's and observation device's optical axes cross so as to measure projected object distance and image distance, observed object distance and image distance.

Where, the relative motion of projection device and observation device includes at least adjusting the relative position of projecting positioner and observing positioner to change the relative distance between projection device and observation device.

The change in the position of projection device and observation device above mentioned can be realized by removing either projecting positioner or observing positioner.

Where, the relative motion of projection device and observation device also includes relative rotating projection device and observation device to adjust the angle of optical axes of projection device and observation device. This relative rotation refers to at least the running of either projection device or observation device.

Where, projection device and observation device rotate do relative one-dimensional rotation around projection device mark point and observation device mark point.

Projecting positioner and observing positioner of this invention at least consist of: projection slider, observation slider and rectilinear motion axis. Projection slider and observation slider can be installed sliding on rectilinear motion axis.

Or, projecting positioner and observing positioner at least consist of: projection rotary positioning table, observation rotary positioning table and rectilinear motion axis. Projection rotary positioning table and observation rotary positioning table are placed on rectilinear motion axis.

Or, projecting positioner and observing positioner consist of: projection slider, observation slider, rectilinear motion axis, projection rotary positioning table and observation rotary positioning table. Projection slider and observation slider are installed sliding at least one rectilinear motion axis. On the sliders place projection rotary positioning table and observation rotary positioning table respectively, on which place projection device and observation device respectively.

In terms of the relative motion of projection device and observation device in this invention, mark points of projection device and observation device are on the same straight line before or after the displacement. In such case projection slider and observation slider can be installed sliding on one rectilinear motion axis.

Where, the line of rotational centers of two rotary positioning tables is parallel to rectilinear motion axis.

Where, projection mark point coincides with the rotational center of projection rotary positioning table, and observation mark point coincides with the rotational center of observation rotary positioning table.

Where, projection device and observation device are pancratic and can define the image of mark point sharply by focusing.

The projection device of this invention consists of: light source, projection condenser that collects the rays from the light source, movable grating, mark point used to cross optical axes of projection device and observation device, movable pancreatic projective lens that can image grating or mark point.

Where, projection device also includes projecting linear positioner that enables projective lens to focus along the optical axis.

In addition, projection device includes grating phase-shift linear positioner that enables grating to move in the plane of grating lines.

The observation device of this invention consists of: (movable for focusing) observer imaging lens that enables the projective imaging of mark subpoint or grating lines on object, observation mark point aiming at the mark subpoint on object surface, camera imaging lens that receives the image produced by observation lens, and CCD camera that receives image signals.

Observation device also includes: movable observer imaging lens that enables the projective imaging of mark subpoint or grating lines on object, observation mark point aiming at the mark subpoint on object surface, observation grating used for interference with projected grating, camera imaging lens that receives the interference fringes formed by observation grating, and CCD camera that receives image signals.

Observation device also includes observing linear positioner that enables observation lens to focus along the optical axis.

The mark point of this invention may be cross wire, ring or spot.

The further-developed sensing device of this invention will also include image capture board for digitization of image signals and computer for data processing.

The technical solutions above mentioned can be combined with each other to develop a new one.

The above measuring method of 3-D object shape by 3-D shape measurement sensing device involves following steps:

1) Utilize the relative motion of projection device and observation device, and the focusing of projection device and observation device to enable projection device's optical axis and observation device's optical axis to cross on the object surface, to determine the field of view of whole-field measurement and position of zero-order fringe;

2) Utilize the triangle formed by projection device's mark point, observation device's mark point and crossing of their optical axes to measure indirectly the projection working distance and observation working distance;

3) Calculate projected object distance, projected image distance, observed object distance and observed image distance;

4) Projection device will finish AF imaging of grating on object surface, and observation device will finish AF imaging of grating fringes on object surface;

5) Data processing.

In step 1), projection device finishes the clear imaging of projection mark point on the object. Observation device finishes the clear imaging of mark subpoint on the object and coincides with the mark point of observation device to produce the cross of the said optical axes.

Where, the mark subpoint projected by projection device onto object surface is at the position of the said zero-order fringe.

In step 2), the said projection working distance is the distance BC between projection device projection mark point and the crossing of optical axes. The said observation working distance is the distance observation device AC between observation mark point and the crossing of optical axes. The said triangle ABC is made of BC, AC and the link line AB from projection device's mark point to observation device's mark point. $\mu$ is the included angle measured by observing positioner, which is formed by observation optical axis and the link line AB from projection device's mark point to observation device's mark point, $\nu$ is the included angle measured by projecting positioner, which is formed by projection optical axis and the link line AB from projection device's mark point to observation device's mark point, AB is the AB distance measured by projection device positioner and observation device positioner, θ is the included angle formed by optical axes of projection device and observation device. Observation working distance AC and projection working distance BC are measured indirectly by formulas (2) and (3):

$$\theta = 180 - \mu - \nu \quad (1)$$

$$AC = AB \times \sin \nu \div \sin \theta \quad (2)$$

$$BC = AB \times \sin \mu \div \sin \theta \quad (3)$$

In step 3), the said observation lens's focal length is $F_2$, observed object distance is ZC, observed image distance is ZCF; projective lens's focal length is $F_1$, projected object distance is $L_P$, projected image distance is $L_{PF}$, A is the distance between projection device's mark point and the center of grating, B is the distance between observation device's mark point and the image surface center of observer imaging lens. A and B are parameters for projection device and observation device. Once the devices are set these parameters will have fixed value. Use formulas (6) and (7) to calculate projected object distance, projected image distance, observed object distance and observed image distance.

$$L_P + L_{PF} \pm A = BC \quad (4)$$

$$Z_C + Z_{CF} \pm B = AC \quad (5)$$

$$\frac{1}{L_P} + \frac{1}{L_{PF}} = \frac{1}{F_1} \quad (6)$$

$$\frac{1}{Z_C} + \frac{1}{Z_{CF}} = \frac{1}{F_2} \quad (7)$$

In step 4), the said automatic focusing (AF) refers to how the focusing projection device forms a clear image of the grating in projection device on object surface on the basis of projected object distance, projected image distance, observed object distance and observed image distance. Focusing observation device will form a clear image of projected grating fringes on object surface.

In step 5), the said data processing includes collecting phase-shift striated pattern and calculating phase distribution and height distribution.

As for the sensing device and measuring method of this invention, the relative motion and focusing of projection device and observation device in the sensing device are utilized to finish the crossing of optical axes and to change projected object distance and image distance, and observed object distance and image distance, to determine accurately the position of zero-order fringe and realize the 3-D high-precision measurement of variable field of view and whole field of objects with different size.

The device and method of this invention can allow for a high-precision whole-field absolute measurement of object surface shape. For the measurement of 300*300 mm field of view, the measurement accuracy is ±0.01 mm, which is 5~10 times that of existing measuring device, and the measurement can be accomplished within 30 s. It is applicable for the high-precision and high-speed whole-field measurement of 3-D objects with complex shape such as engine leaf.

The following is detailed description of the invention with charts and embodiments. The said embodiments are used to describe not to limit this invention.

BRIEF DESCRIPTION OF THE INVENTION

Chart 1. Sketch of the principle of existing parallel optical axes 3-D shape measuring device;

Chart 2. Sketch of the principle of existing cross-optical axes 3-D shape measuring device;

Chart 3. Sketch of one embodiment for 3-D shape measuring device of this invention;

Chart 4. Sketch of one embodiment for projection device of this invention;

Chart 5. Sketch of one embodiment for observation device of this invention;

Chart 6. Sketch of parameter calculation of sensing device for 3-D shape measurement of this invention;

Chart 7. Sketch of the principle of sensing device for 3-D shape measurement of this invention;

Chart 8. Method flow chart of sensing device for 3-D shape measurement of this invention;

Chart 9. Sketch of one embodiment for sensing device for 3-D shape measurement of this invention;

Chart 10. Sketch of one embodiment for sensing device for 3-D shape measurement of this invention;

Chart 11. Sketch of another embodiment for projection device of this invention;

Chart 12. Sketch of another embodiment for observation device of this invention;

Chart 13. Sketch of one embodiment for observation device with observation grating of this invention;

Chart 14. Sketch of another embodiment for 3-D shape measuring device of this invention;

Chart 15. Sketch of another embodiment for sensing device for 3-D shape measurement of this invention;

Chart 16. Sketch of variable field of view of sensing device for 3-D shape measurement of this invention.

DETAILED DESCRIPTION OF THE INVENTION

Refer to Chart 15: in an embodiment of this invention, the projecting positioner and observing positioner are equipped with projection slider 41, observation slider 42 and rectilinear motion axis 40. Projection slider 41 and observation slider 42 can be installed sliding on rectilinear motion axis 40. Projection device 70 is installed on projection slider 41 and observation device 80 is placed on slider 42. The relative distance between projection device and observation device can be changed by the movement of sliders 41 and 42 on rectilinear motion axis 40 to enable the crossing of optical axes of projection device 70 and observation device 80 on the object surface and to adjust the field of view and operating distance for measurement of objects with different size. In such case, when place projection device 70 and observation device 80 on rectilinear motion axis 40, their optical axes mustn't be parallel.

Refer to Chart 10: in another embodiment of this invention, projecting positioner and observing positioner are equipped with rectilinear motion axis 40, projection rotary positioning table 50 and observation rotary positioning table 60. Projection rotary positioning table 50 and observation rotary positioning table 60 are placed with a fixed distance directly on rectilinear motion axis 40. Projection device 70 is installed on projection rotary positioning table 50 and observation device 80 is installed on observation rotary positioning table 60. Use projection rotary positioning table 50 or observation rotary positioning table 60 to enable the rotation of projection device 70 or observation device 80 to make the optical axes of projection device 70 and observation device 80 cross on object surface and adjust the field of view. Of course, the simultaneous running of projection rotary positioning table 50 and observation rotary positioning table 60 also can make optical axes of projection device 70 and observation device 80 cross on object surface and adjust the field of view and operating distance to measure objects with different size.

Refer to Chart 9: in another embodiment of this invention, projecting positioner and observing positioner are equipped with projection slider 41, observation slider 42 and rectilinear motion axis 40. In such case, place a projection rotary positioning table 50 on the said projection slider 41, and an observation rotary positioning table 60 on observation slider 42. Projection device 70 is installed on projection rotary positioning table 50 and observation device 80 is installed on observation rotary positioning table 60. Use rotation of projection rotary positioning table 50 and/or observation rotary positioning table 60 and sliding of sliders to enable the movement or rotation of projection device 70 and/or observation device 80, make optical axes of projection device 70 and observation device 80 cross on object surface and adjust the field of view, so as to measure objects with different size.

Where, the mark point of projection device 70 coincides with the rotating center of projection rotary positioning table 50, and the mark point of observation device 80 coincides with the rotating center of observation rotary positioning table 60.

Moreover, the link line of rotating centers of projection rotary positioning table 50 and observation rotary positioning table 60 is parallel to rectilinear motion axis 40.

Rotary positioning tables 50 and 60 can move at 0-360°, while the preferred rotation angle is within 180° facing the object.

The sensing device for 3-D shape measurement of this invention can be placed on one, two or three-coordinates mobile devices, such as moving arm, tripod or platform of three-coordinates measuring machine to change the field of view and measure projection operating distance and observation working distance of objects with different size by one, two or three-dimensional motion.

Refer projection device 70 to Chart 4: rays from light source 71 are converged by condenser 72, and then irradiate grating 73 or projection mark point 74 behind the grating. Projective lens linear positioner 76 controls projective lens 75 to moving focus along the optical axis and form the image of grating 73 or mark point 74. Use projection grating linear positioner 77 to control the movement of grating 73 in grating plane to finish precise phase-shift.

The projection mark point 74 and grating 73 in projection device 70 also can be placed on mark point and grating switch 79, to switch projection mark point or grating into beam path separately. See Chart 11.

Refer observation device 80 to Chart 5: observing linear positioner 89A controls observation lens 89 to move along the optical axis to focus the mark subpoint or grating fringes projected by projection device onto the object. Observation mark point splicer 83 can switch mark point 83A into beam path so as to aim it accurately at the mark subpoint on object surface, make optical axes cross and determine the position of zero-order fringe. The mark subpoint or grating fringes projected onto object surface form their images through observer imaging lens 89 on the image surface of observer imaging lens 89, and are received through camera imaging lens 82 by camera 81.

Refer observation device 80 to Chart 12: set up observing beam path B and measuring beam path A separately. The only difference of measuring beam path A from Chart 5 is that in the beam path there are not observation mark point splicer 83 and mark point 83A on it. Observing beam path consists of observation lens 89 that is also included by measuring beam path, observation lens linear positioner 89A that controls observation lens 89 to move along the optical axis, square prism 84 for vertical light splitting from measuring beam path, which is behind observation lens 89, mark point 85 between square prism 84 and reflector 86, reflector 86 that changes the beam path direction by 90°, observation camera 88 that forms the image of mark point 85 and observation camera imaging lens 87 in the front of it. 85A in Chart 12 is the conjugate point of mark point.

Refer observation device 80 to Chart 13: set up observing beam path B and measuring beam path A separately. The only difference of measuring beam path A from Chart 5 is that in the beam path there is observation grating 83B instead of observation mark point splicer 83 and mark point 83A on it. Observing beam path consists of observation lens 89 that is also included by measuring beam path, observation lens linear positioner. 89A that controls observation lens 89 to move along the optical axis, square prism 84 for vertical light splitting from measuring beam path, which is behind observation lens 89, mark point 85 between square prism 84 and reflector 86, reflector 86 that changes the beam path direction by 90°, observation camera 88 that forms the image of mark point 85 and observation camera imaging lens 87 in the front of it. 85A in Chart 13 is the conjugate point of mark point.

Chart 8 is the measuring method flow of sensing device for 3-D shape measurement of this invention. When measuring, locate the object at a place where observation device 80 can form its whole-field image. Adjust the imaging lens of projection device 70 and turn or move projection device 70 to enable a clear image of projection mark point 74 on object surface. If the projection mark point and grating in projection device 70 are placed on mark point and grating switch 79, projection mark point shall be switched into the beam path before the activities above are conducted.

When observation device 80 achieves its observation and measurement through the switching of observation mark point switch 83, firstly switch the observation mark point 83A into the beam path, adjust the imaging lens of observation device 80, focus the mark subpoint, to enable the mark subpoint on the object to form a clear image both on the image surface of observer imaging lens 89 and the image surface of camera 81. Rotate or move observation device 80 to make the mark subpoint on the object coincide with the observation mark point 83A in observation device 80. Now the optical axes of projection device and observation device cross, projection device mark point 74, observation device's mark point 83A and the mark subpoint on the object form a triangle Δ ABC, as showed in Chart 6.

When observation device 80 has observing beam path B or measuring beam path A, adjust the imaging lens of observation device 80 to enable the mark subpoint on the object to form a clear image on the image surface of observer imaging lens 89. After light-splitting by square prism 84, go through reflector 86 and observation camera imaging lens 87, mark point 85 and the mark subpoint on the object get their images on observation camera 88. Rotate or move observation device 80 to make the mark subpoint on the object coincide with the mark point 85 in observation device 80. Now the optical axes of projection device and observation device cross, projection device mark point 74, conjugate point of observation device's mark point 85A and the mark subpoint on the object form a triangle△ ABC, as showed in Chart 6.

In fact, in the sensing device for 3-D shape measurement of this invention, the change in the relative position of projection device and observation device is not limited to the movement on a rectilinear motion axis. In order to check 3-D shape of objects with different size, we can change the relative position of projection device and observation device at will. Like that in Chart 16—a sketch of field of view change of the sensing device for 3-D shape measurement: when check the object, projection device, observation device and object are at A', B' and C respectively. If these positions can't meet the demand for measurement of the object, move projection device and/or observation device to places A and B to satisfy measurement requirements. This movement may be achieved by at least one rectilinear motion axis B'B and/or A'A or other ways available according to existing techniques, which is known by technicians in this field. The measurement of object surface shape at every place is finished by the triangles A'B'C and △ ABC formed by projection device's mark point, observation device's mark point or conjugate point of mark point, and mark subpoint on the object respectively.

After the triangle is determined, indirect measurement of projection working distance and observation working distance is available. Take△ ABC for example: the included angle v or µ formed by projection optical axis or observation optical axis and the link line AB from mark point 74 in projection device to mark point 83A or its conjugate point 85A in observation device can be measured by rotary positioning positioner. The distance of link line AB from mark point 74 in projection device to mark point 83A or its conjugate point 85A in observation device can be measured by rectilinear motion axis 40 with grating ruler or be indirectly measured by rectilinear motion axis. The included angle θ formed by optical centers of projection device and observation device, and the distances BC and AC between projection device's mark point 74, observation device's mark point 83A or its conjugate point 85A and the mark subpoint on the object, namely, projection working distance and observation working distance, can be calculated by following formulas (2) and (3):

$$\theta = 180 - \mu - v \quad (1)$$

$$AC = AB \times \sin v \div \sin \theta \quad (2)$$

$$BC = AB \times \sin \mu \div \sin \theta \quad (3)$$

In order to avoid any possible personal error and get a clear imaging of grating 73 on the object, the given observed object distance, observed image distance, projected object distance and projected image distance must be accurate. In this invention, we can calculate accurate values of observed object distance, observed image distance, projected object distance and projected image distance, conduct automatic focusing based on these values and use camera 81 to record the clear grating line image on the object.

As showed in Chart 7: suppose the focal length of observation lens is $F_2$, observed object distance is ZC, observed image distance is ZCF; the focal length of projective lens is $F_1$, projected object distance is $L_P$, projected image distance is $L_{PF}$. A and B are known parameters of projection device and observation device, and they have fixed values once the devices are determined. Then:

$$L_P + L_{PF} \pm A = BC \quad (4)$$

$$Z_C + Z_{CF} \pm B = AC \quad (5)$$

$$\frac{1}{L_P} + \frac{1}{L_{PF}} = \frac{1}{F_1} \quad (6)$$

$$\frac{1}{Z_C} + \frac{1}{Z_{CF}} = \frac{1}{F_2} \quad (7)$$

After lens is decided, its focal length $F_1$ or $F_2$ is a fixed value. For this invention the focal length of lens is 16-50 mm.

Get $Z_C$, $Z_{CF}$, $L_{PF}$ and $L_P$ according to equations (4), (5), (6) and (7).

Conduct automobile focusing according to calculated values:

Adopt the projection device in Chart 4: utilize projecting linear positioner to move the projective lens 75 of projection device 70, make rays from the light source in projection device 70 go through grating 73 and then form a clear image on the visual surface of the object;

Adopt the projection device in Chart 11: when the projection mark point 74 and grating 73 in projection device 70 are placed on mark point and grating switch 79, the grating shall be switched into the beam path;

Adopt the observation device in Chart 12: utilize observing linear positioner 89A to move the imaging lens 89 of observation device 80 to get a clear image of projected grating fringes on the object surface. Camera 81 in observation device 80 shall record grating fringe image;

Adopt the observation device in Chart 5: when the projection mark point in observation device 80 is placed on mark point switch 83, mark point 83A shall be switched out of the beam path. Camera 81 in observation device 80 shall record grating fringe image on object surface;

Adopt the observation device in Chart 13: utilize observing linear positioner 89A to move the imaging lens 89 of observation device 80 to get a clear image of projected grating fringes on the object surface. Camera 81 in observation device 80 shall record the grating interference fringe image on observation grating surface.

CCD camera 81 in observation device 80 will input the image it records in image capture board (that is not showed in Chart) for digitization, and the digitized fringe image is input in computer (not showed in Chart), then get a digitized fringe chart. Move the grating in projection device, collect four fringe image charts by CCD camera 81 at one fourth grating spacing, two fourths grating spacing, three fourths grating spacing and one grating spacing to the direction perpendicular to the optical axis respectively and transfer them into computer by image capture board, then get 0-2π phase diagrams by phase-shift algorithm.

$$I_1 = I_0 + A\sin(\varphi + 0) \quad (8)$$

$$I_2 = I_0 + A\sin\left(\varphi + \pi\frac{1}{2}\right) \quad (9)$$

$$I_3 = I_0 + A\sin(\varphi + \pi) \quad (10)$$

$$I_4 = I_0 + A\sin\left(\varphi + \frac{3\pi}{2}\right) \quad (11)$$

-continued $$\varphi = tg^{-1} \frac{I_4 - I_2}{I_1 - I_3} \quad (12)$$

Where, $I_0$ is ambient light intensity, A is fringe contrast, $\phi$ is phase at every point on the object surface.

Use unwrapping algorithm to get the principle of phase diagram as follows:

For the phase-shifted phase diagram, by the criterion $\phi_2-\phi_1 \geq \pi$, $\phi_2=\phi_1-2\pi$; and $\phi_2-\phi_1 \leq -\pi$, $\phi_2=\phi_1+2\pi$, they can be unwrapped to continuously changed phase distribution.

Suppose the observed object distance $Z_C$, observed image distance $Z_{CF}$, projected image distance $L_{PF}$, projected object distance $L_P$, included angel $\theta$ of optical centers of projection device and observation device at the place of object, grating spacing P are given, in virtue of the projected grating/moire height and phase formula put forward by Masanori Idesawa in *Scanning moiré method and automatic measurement of 3-D shapes* published on Applied Optics (vol.16, No.8 August.1977, pp2152-2162), we can get the surface shape of 3-D object.

Following are detailed embodiments of this invention:

Embodiment 1

See Charts 3 and 15. Install projection device 70 on projection slider 41 of rectilinear motion axis 40 with grating ruler and double sliders. Install observation device 80 on observation slider 42 of rectilinear motion axis 40 with double sliders. The rectilinear motion axis 40 with double sliders is hung on three-coordinates moving arm 30 that can do three-dimensional movement, and keeps vertical to Z shaft of three-coordinates moving arm. The optical centers of observation device 80 and projection device 70 are at a same level, the to-be-measured object is installed on the rotary positioning table which can do 360° rotation (German PI Company's rotary positioner M039). Projection device 70 joins with power supply by cable. The observation camera 81 and observation camera 88 of observation device 80 joins with Matrox Pulser 4-channel image capture board by cable (not showed in the Chart), and the image capture board is plugged in computer (not showed in the Chart). The projective imaging lens linear positioner 76 in projection device 70 adopts German PI Company's linear positioner M224.20, the grating linear positioner 77 adopts German PI Company's linear positioner M222.20. The observer imaging lens linear positioner 89A in observation device 80 adopts German PI Company's linear positioner M224.20. The linear positioner and rotary positioner are connected by cables with a four-channel DC electric machine control panel C-842.40 produced by German PI Company. The latter is plugged in the computer.

Refer projection device 70 to Chart 4. It consists of light source 71 that produces white light in front of condenser 72, grating 73 and projective lens 75 in front of the mark point (cross wire 74 in this embodiment). The movement of grating 73 in grating plane is controlled by grating linear positioner 77, and the movement of projective lens 75 along the optical axis is controlled by projective lens linear positioner 76.

Refer observation device 80 to Chart 12. It includes measuring beam path and observing beam path. The said observing beam path consists of observation lens 89, observation lens linear positioner 89A that controls observation lens 89 to move along the optical axis, square prism 84 for vertical light splitting from measuring beam path, which is behind observation lens 89, mark point - - - cross wire 85 between square prism 84 and reflector 86, reflector 86 that changes the beam path direction by 90°, observation camera 88 that forms the image of mark point 85 (cross wire in this embodiment) and observation camera imaging lens 87 in the front of it. Fully aim the mark point in observing beam path at the mark subpoint projected by projection device 70 on the object to achieve the crossing of optical axes of projection device 70 and observation device 80 and to determine the position of zero-order fringe. The said measuring beam path consists of observer imaging lens 89, linear positioner 89A that controls observation lens 89 to move along the optical axis, camera 81 used to receive the grating fringes on object surface and camera imaging lens 82 in front of it. The grating fringes projected onto object surface get an image on the image surface of observer imaging lens 89 and will be received by camera 81 with camera imaging lens 82. The focal length of projective lens 75 is 50 mm, and the focal length of observation lens 89 is 50 mm.

Refer to Chart 8. When measuring, firstly make a three-dimensional adjustment of three-coordinates moving arm 30, projection slider 41 and/or observation slider 42 to adapt the field of view of projection device 70 and observation device 80 to the size of measured object. Move projective imaging lens linear positioner 77 to enable projective lens 76 to produce a clear image of cross wire 74 on the object surface and get a shadow of cross wire. Adjust the imaging lens linear positioner 89A of observation device to make the shadow cross wire imaged by projective imaging lens 75 on the object get a clear image on the target of camera 88. Adjust the slider 41 or 42 of rectilinear motion axis 40 to coincide the shadow cross wire on the object with cross wire 85 of observation device. Now the optical axes of projection device 70 and observation device 80 cross. The rectilinear motion axis with grating ruler will measure the value of link line AB from projection device's mark point to observation device's mark conjugate point 85A. According to the values of included angles v and μ, which are formed by projection device and the link line AB, and observation device and the link line AB respectively, and the value of AB, the computer will give accurate values of observed object distance, observed image distance, projected object distance and projected image distance by formulas (4)-(7) and do automatic focusing on the basis of above values, namely, readjust projective imaging lens linear positioner 76 to enable projective lens 75 to form a clear image of grating line 73. Fine adjust observer imaging lens linear positioner 89A to enable observation lens 89 to form a clear image of grating line 73 on the object. Then move projected grating 73, when the grating moves at one fourth grating spacing, two fourths grating spacing, three fourths grating spacing and one grating spacing along the direction perpendicular to the optical axis respectively, collect four fringe image samples by viewing camera, input them into image capture board and the digitized fringe image is input in computer, then get a digitized fringe chart. Get 0-2π phase diagrams by phase-shift algorithm, and finally develop the phases with mark subpoint as zero-order phase, calculate the height distribution of the object by relevant formulas to get the values of points Xz, Yz and Z in the field of view in this way. Rotate the rotary stage to change the measurement surface and repeat this process, then we can get the surface shape of 3-D object.

Embodiment 2

Refer to Chart 3. The sensing device can be installed on three-coordinates moving arm, like that in Chart 10. The projection rotary positioning table 50 adopts German PI Company's rotary positioner M039, installed on rectilinear motion axis 40. The observation rotary positioning table 60 adopts German PI Company's rotary positioner M039, installed on rectilinear motion axis 40. Projection device 70 is installed on projection rotary positioning table 50 and observation device 80 is installed on observation rotary positioning table 60. The mark point 73 of projection device 70 coincides with the rotating center of projection rotary positioning table 50, and the mark point 83A of observation device 80 coincides with the rotating center of rotary positioning table 60. The optical axis of observation device 80 and rectilinear motion axis 40 are crossed as a $\mu$ angle, the optical axis of projection device 70 and rectilinear motion axis 40 are crossed as a $\nu$ angle, and the optical axes of projection device and observation device are crossed as a $\theta$ angle. The measured object is installed on a rotary positioning table (German PI Company's rotary positioner M039). Projection device 70 is connected by cable with power supply. The measuring camera 81 of observation device 80 is connected by cable with four-channel image capture board (not showed in the Chart), and the image capture board is plugged in the computer (not showed in the Chart). The projective lens linear positioner 76 of projection device 70 adopts German PI Company's linear positioner M224.20, grating linear positioner 77 adopts German PI Company's linear positioner M222.20. The observer imaging lens linear positioner 89A of observation device 80 adopts German PI Company's linear positioner M224.20. Linear positioner and rotary positioner are connected by cable with German PI Company's two four-channel DC electric machine control panels C-842.40 respectively, which is plugged in the computer. Other parts that need to be automatically controlled are connected with the computer.

Refer projection device 70 to Chart 11. It consists of light source 71, condenser 72, mark point—ring 74 and grating 73 are placed on grating ring switch 79, projective lens 75, projective lens linear positioner 76, and grating linear positioner 77.

Refer observation device 80 to Chart 5. It consists of observation camera 81, measuring camera imaging lens 82, mark point - - - ring 83A is placed on ring switch 83, observer imaging lens 89, and observer imaging lens linear positioner 89A.

The focal length of projective lens 75 is 50 mm, the focal length of observation lens 89 is 50 mm, and the focal length of viewing camera imaging lens 82 is 30 mm.

Refer to Chart 8. When measuring, firstly make a three-dimensional adjustment of three-coordinates moving arm 30 to adapt the field of view of projection device 70 and observation device 80 to the size of measured object. Then splice the ring 74 of projection device grating ring switch 79 into the beam path. Move projective imaging lens linear positioner 76 to enable imaging lens 75 to produce a clear image of ring. Splice the ring 83A of observation device ring switch 83 into the beam path. Adjust observer imaging lens linear positioner 89A and projection positioning table 50 or observation positioning table 60 to make the shadow ring imaged by measuring camera imaging lens 89 onto the target of measuring camera 81 coincide with the ring S3A of observation device. Now refer to Chart 8 and steps of Embodiment 1, the computer will read the values of angles $\nu$ and $\mu$ formed by projection device 70 or observation device 80 and AB respectively and input the fixed value of AB to calculate projected object distance and image distance, observed object distance and image distance. Do automatic focusing on the basis of above values, splice grating 73 of grating ring switch 79 in projection device 70 into the beam path, and move ring 83A of ring switch in observation device 80 out of the beam path. Then move projected grating 73, when the grating moves at one fourth grating spacing, two fourths grating spacing, three fourths grating spacing and one grating spacing along the direction perpendicular to the optical axis respectively, collect four fringe image samples by viewing camera. See Embodiment 1 for detailed steps. Then we can get the surface shape of 3-D object.

Embodiment 3

Refer to Chart 3. The sensing device can be installed on three-coordiniates moving arm, like that in Chart 9. Projecting positioner and observing positioner are equipped with projection slider 41, observation slider 42 and rectilinear motion axis 40. In such case, the said projection slider 41 has a projection rotary positioning table 50 on it, which adopts German PI Company's rotary positioner M039, and the observation slider 42 has an observation, rotary positioning table 60, which adopts German PI Company's rotary positioner M039. Projection device 70 (see Chart 11) is installed on projection rotary positioning table 50, and observation device 80 (see Chart 5) is installed on observation rotary positioning table 60. Utilize projection rotary positioning table 50 and/or observation rotary positioning table 60 and movement of sliders, drive respectively the movement or rotation of projection device 70 and/or observation device 80, so as to enable the optical axes of projection device 70 and observation device 80 cross on the object surface. Adjust the field of view to measure objects with different size. Projection device 70 is connected by cable with power supply. Measuring camera 81 of observation device 80 is connected by cable with four-channel image capture board (not showed in the Chart), which is plugged in the computer (not showed in the Chart). Projective lens linear positioner 76 of projection device 70 adopts German PI Company's linear positioner M224.20, grating linear positioner 77 adopts German PI Company's linear positioner M222.20. Observer imaging lens linear positioner 89A of observation device 80 adopts German PI Company's linear positioner M224.20. Both linear positioner and rotary positioner are connected by cable with German PI Company's two four-channel DC electric machine control panels C-842.40, which is plugged in the computer. Other parts that need to be automatically controlled are connected with the computer.

The focal length of projective lens 75 is 50 mm, the focal length of observation lens 89 is 50 mm, and the focal length of viewing camera imaging lens 82 is 30 mm.

Its working process is same to Embodiment 2.

Embodiment 4

Refer to Chart 14. The sensing device can be installed on a marble platform with rectilinear motion axis. Utilize the movement of sensing device, distance change of projection device 70 and observation device 80 to adapt the field of view of projection device 70 and observation device 80 to the size of the measured object. Other steps are same to Embodiment 1, with only difference of that observation device has an observation grating. See Chart 13. The image received by measuring camera 81 is grating interference fringe. The calculation is finished by formulas above.

The invention claimed is:

1. An imaging system for obtaining a full field three dimensional topography of an object, comprising:
   a. a projection device having a projecting optical axis comprised of a radiant, a movable projection lens and a first grating having a plurality of grating grooves on one surface and having a caved spot on its opposite surface wherein said caved spot serves as a mark point of said projection device;
   b. an imaging device having an imaging optical axis comprised of a movable imaging lens and a first photoelectrical component including a first CCD camera, wherein said imaging lens and said first photoelectrical component are positioned so as to be aligned with said imaging optical axis;
   c. a first rotary table having a rotational axis, wherein said projection device is affixed onto said first rotary table so that said projecting optical axis is perpendicular to said rotational axis of the first rotary table, and a second rotary table having a rotational axis, wherein said imaging device is affixed onto said second rotary table so that said imaging optic axis is perpendicular to said rotational axis of the second rotary table;
   d. an elongated member which moves in a three-dimensional space having a horizontal top surface, a first end and a second end comprised of first and second horizontal components, wherein said first and second horizontal components are movably positioned on said top surface of said elongated member, said first rotary table is rotatably connected to said first horizontal component wherein said rotational axis of said first rotary table is perpendicular to said horizontal top surface of the elongated member, said second rotary table is rotatably connected to said second horizontal component wherein said rotational axis of said second rotary table is perpendicular to the horizontal top surface of said elongated member;
   e. a third rotary table having a rotational axis which is parallel to said rotational axis of said first and said second rotary tables, wherein said object is positioned on said third rotary table and said elongated member is movable relative to the third rotary table;
   f. means for adjusting respective positions of said projection device, said imaging device and said elongated movable member, which causes said projecting optical axis to join said imaging optical axis on an outer surface of said object to thereby obtain an adjustable projecting field to fit objects having variable sizes; and
   g. means for obtaining said full field three dimensional topography of said object with a high accuracy including taking sequential images of said object.

2. The system as claimed in claim 1, wherein said imaging device is further comprised of a mark point switcher including a first imaging mark point so that said first imaging mark point can be switched to a position between said imaging lens and said first photoelectrical component, wherein said mark point is further aligned with said imaging optical axis.

3. The system as claimed in claim 2, wherein said adjusting positions causes respective mark points of respective projection and imaging devices to align with respective rotational axes of respective said first and said second rotary tables.

4. The system as claimed in claim 2, wherein said mark points of the respective projection device and imaging device are positioned to align with a line which is parallel to said horizontal surface of said elongated member before and after said adjusting positions of said respective projection and imaging devices.

5. The system as claimed in claim 1, where said imaging device is further comprised of:
   a. a beam splitter which is positioned between said imaging lens and said first photoelectrical component, wherein said beam splitter is aligned with said imaging optical axis, the beam splitter splits an incident beam aligned with said imaging optical axis which passes through said imaging lens to form a first beam and a second beam, wherein said first and said second beams are positioned in the same plane and 90 degrees relative to each other, and said first beam is aligned with said imaging optical axis;
   b. a second imaging mark point which is positioned to align with said second beam;
   c. a beam reflector which is positioned behind said second imaging mark point which is behind said beam splitter, wherein said beam splitter, said second imaging market point and said beam reflector are positioned to aligned with each other, said beam reflector reflects said second beam at 90 degrees into a third beam, wherein said first, second and third beams are positioned in the same plane;
   d. a second photoelectrical component such as a second CCD camera which is positioned to align with said third beam; and
   e. a conjugated imaging mark point which is conjugate to said second imaging mark point, said conjugated imaging mark point is positioned between said beam splitter and said first photoelectrical component which is further aligned with said first beam.

6. The system as claimed in claim 5, further comprising an imaging grating which is positioned between said beam splitter and said conjugated imaging mark point, said imaging grater is also aligned with said first beam.

7. The system as claimed in claim 5, wherein said adjusting positions causes respective mark points of respective projection and imaging devices to align with respective rotational axes of respective first and said second rotary tables.

8. The system as claimed in claim 5, wherein said mark points of the respective projection device and said imaging device are positioned to align with a line which is parallel to said horizontal surface of said elongated member before and after said adjusting positions of said respective projection and imaging devices.

9. The system as claimed in claim 1, wherein said adjusting positions at least includes adjusting a relative position of said projection device and said imaging device to thereby change a distance between said devices.

10. The system as claimed in claim 1, wherein said adjusting positions at least includes rotating respectively said projection device and said imaging device to adjust an angle formed by said optical axis of said projection device and said optical axis of said imaging device.

11. The system as claimed in claim 1, said first and said second horizontal components are installed onto said elongated member through a sliding movement.

12. The system as claimed in claim 1, wherein a center of said first rotary table is positioned to align with a center of said second rotary table, said centers are further positioned in parallel with said top surface of said elongated member.

13. The system as claimed in claim 1, wherein said projection device and said imaging device are pancreatic.

14. The system as claimed in claim 1, wherein said projection device is further comprised of said first grating which is movable and said mark point which intercepts said optical axis of said projection device so that said movable projection lens enables a focus on said grating grooves or said mark point of said first grating of said projection device.

15. The system as claimed in claim 1, wherein said projection device is further comprised of a linear positioning structure which enables said projection lens to move so as to be aligned with said optical axis to thereby focus on including said object.

16. The system as claimed in claim 1, wherein said projection device is further comprised of an additional linear positioning structure for a horizontal movement of said first grating which is positioned perpendicular to said horizontal surface of said elongated member, said movement causes a phase-shifting effect of changing grating fringes which are projected onto an exterior surface of said object.

17. The system as claimed in claim 1, wherein said imaging device is further comprised of a linear positioning structure which enables said imaging lens to move so as to be aligned with said imaging optical axis to thereby focus on including said grating fringes on said object.

18. The system as claimed in claim 1, wherein said mark point is in a shape which includes a cross hair, a circular ring and a spot.

19. The system as claimed in claim 1, wherein said imaging device comprises an image capture board for digitization of image signals, and a computer for data processing.

20. A method for obtaining a full field three dimensional topography of an object, comprising the steps of:
   a. providing a rotatable projection device having a projecting optical axis which is comprised of a radiant, a first grating having a mark point and a movable projection lens;
   b. providing a rotatable imaging device having an imaging optical axis which is comprised of a movable imaging lens and a photoelectrical component including a first CCD camera;
   c. providing an elongated member having a horizontal top surface which enables to move in a three-dimensional space, said elongated member is further comprised of first and second horizontal components, wherein said first and second horizontal components are movably positioned on said top surface of said elongated member, said projection device is rotatably connected to said first horizontal component, said imaging device is rotatably connected to said second horizontal component;
   d. providing a third rotary table for positioning said object, said elongated member is movable relative to said third rotary table;
   e. adjusting positions of said respective projection device, said imaging device and said elongated member, which joins said projecting optical axis and said imaging optical axis onto an exterior surface of said object; and
   g. obtaining said full field three dimensional topography of said object with a high accuracy including taking sequential images of said object.

21. The method as claimed in claim 20, wherein said imaging device is further comprised of an imaging mark point which is aligned with said imaging optical axis.

22. The method as claimed in claim 21, further comprising steps of:
   a. constructing a triangle ABC for an accurate object topography, wherein said triangle has points of respective A, B and C and lines of respective ab, ac, and bc, said line ab links said points A and B where its length is obtained through a measurement, said line ac links said points A and C and said line bc links said points B and C;
   b. assigning a position of said mark point of said projection device as said point B, a position of said object as said point C, and a position of said imaging mark point as said point A;
   c. assigning an angle v which is determined by joining said line bc and said line ab, angle $\mu$ which is determined by joining said line ab and said line ac, and an angle $\theta$ which is determined by joining said line ac and said line bc, wherein $\theta+\mu+v=180$ degrees;
   d. calculating a respective length of said line ac and said line bc following the respective equations [1] and [2]:

$$ac = ab \times \sin v \div \sin \theta \quad [1]$$

$$bc = ab \times \sin \mu \div \sin \theta \quad [2]$$

e. calculating a projected object distance $L_p$ for said projection device, a projected image distance of said object $L_{PF}$ for said projection device, an imaged object distance $Z_C$, for said imaging device and an imaged imaging distance $Z_{CF}$ for said imaging device according to following equations [3], [4], [5] and [6]:

$$L_P + L_{PF} \pm x = bc \quad [3]$$

$$Z_C + Z_{CF} \pm y = ac \quad [4]$$

$$1/L_P + 1/L_{PF} = 1/F_1 \quad [5]$$

$$1/Z_C + 1/Z_{CF} = 1/F_2 \quad [6]$$

wherein x is a constant for a distance between said mark point and a center of said first grating of said projection device, y is a constant for a distance between said mark point and a center of an imaging surface such as a lens of said CCD camera of said imaging device, $F_1$ is a focal length of said projection lens of said projection device, and $F_2$ is a focal length of said imaging lens of the imaging device, and
   f. using said calculated projected object distance $L_P$, projected image distance of said object $L_{PF}$, imaged object distance $Z_C$, and imaged imaging distance $Z_{CF}$ for obtaining said accurate topography of said object.

23. The method as claimed in claim 22, wherein an automatically focusing is achieved after applying said projected object distance, said projected image distance, said imaged object distance and said imaged imaging distance, where a clear pattern of said grating fringes is formed on said object exterior surface, and a clear pattern of said grating fringes is achieved onto said target plane of said first CCD camera of said imaging device.

24. The method as claimed in claim 22, further comprising a data processing including collecting a phase-shift of said grating fringes, calculating a phase distribution and a height distribution of said sequential images of said subject.

25. The method as claimed in claim 20, wherein joining said projecting and said imaging optical axes is achieved by projecting said mark point of said projection device onto said object, and imaging a pattern of said projected mark point on said object through said imaging device, and aligning said projected mark point with said imaging mark point of said imaging device.

26. The method as claimed in claim 20, wherein said adjusting position is further comprised of focusing said projection device to form grating fringes of said first grating onto said exterior surface of said object, and focusing said imaging device to form an image of said grating fringes on said object onto a target plane of said first CCD camera of said imaging device.

27. The method as claimed in claim 26, wherein said grating fringes which are a mark subpoint is projected by said projection device onto the exterior surface of said object, said grating fringes are at a zero-order according to a condition of joining said projecting and said imaging optical axes.

28. An imaging system for obtaining a full field three dimensional topography of an object which is positioned on a two-dimensional plane, comprising:

a. a projection device having a projecting optical axis comprised of a grating, wherein said grating is additionally comprised of a mark point;
b. an imaging device comprising an imaging optical axis;
c. means for adjusting positions of said respective projection device and said imaging device, which causes said projecting optical axis to join said imaging optical axis on an exterior surface of said object to thereby obtain an adjustable projecting field to fit objects having variable sizes, wherein said mark point is used during position adjustment; and
d. means for obtaining said full field three dimensional topography of said object with a high accuracy through taking sequential images of said object.

* * * * *